(12) United States Patent
Piek et al.

(10) Patent No.: US 8,441,579 B2
(45) Date of Patent: May 14, 2013

(54) MOTION JUDDER CANCELLATION IN IMAGE SEQUENCES

(75) Inventors: Matthijs Carolus Piek, 's-Hertogenbosch (NL); Herman Schoemaker, Veldhoven (NL); Eric Kathmann, Waalre (NL)

(73) Assignee: Entropic Communications, Inc., San Diego, CA (US)

(*) Notice: Subject to any disclaimer, the term of this patent is extended or adjusted under 35 U.S.C. 154(b) by 919 days.

(21) Appl. No.: 12/063,074

(22) PCT Filed: Aug. 3, 2006

(86) PCT No.: PCT/IB2006/052673
§ 371 (c)(1),
(2), (4) Date: Sep. 19, 2008

(87) PCT Pub. No.: WO2007/017808
PCT Pub. Date: Feb. 15, 2007

(65) Prior Publication Data
US 2010/0201882 A1 Aug. 12, 2010

(30) Foreign Application Priority Data
Aug. 9, 2005 (EP) .................................. 05107305

(51) Int. Cl.
*H04N 5/00* (2006.01)
(52) U.S. Cl.
USPC ........... 348/607; 348/441; 348/458; 348/459; 348/E5.078
(58) Field of Classification Search ................... 348/607, 348/E5.078
See application file for complete search history.

(56) References Cited

U.S. PATENT DOCUMENTS

| 5,610,662 A | 3/1997 | Hackett |
| 6,041,142 A | 3/2000 | Rao et al. |

FOREIGN PATENT DOCUMENTS

| EP | 0685968 A2 | 12/1995 |
| EP | 1551181 A2 | 7/2005 |
| JP | 2001024988 A | 1/2001 |
| WO | 02056597 A1 | 7/2002 |
| WO | WO 02056597 A1 * | 7/2002 |
| WO | 2004054256 A1 | 6/2004 |
| WO | WO 2004054256 A1 * | 6/2004 |
| WO | 2006043203 A2 | 4/2006 |

OTHER PUBLICATIONS

Lee, Young Ho; et al "Judder-Free Reverse Pull-Down Using Dynamic Compensation" IEEE Transactions on Consumer Electronics, vol. 51, No. 1, Feb. 28, 2005, pp. 256-261.

* cited by examiner

*Primary Examiner* — Jefferey Harold
*Assistant Examiner* — Omer Khalid
(74) *Attorney, Agent, or Firm* — Bruce Greenhaus; Richard Bachand; Duane Morris LLP

(57) ABSTRACT

In a device for processing baseband signal images (BS), a film detector determines whether a same baseband signal image includes both information from a film image and information from a video source image, information from one film image being present in at least two baseband signal images while information from one video source image is present in only one baseband signal image. A processing unit processing the baseband signal images in such a manner that in the presence of both information from the film image and information from the video source image in the same baseband signal image, for each film image only one of the at least two baseband signal images is used to obtain a display signal image (DS).

7 Claims, 5 Drawing Sheets

MOTION JUDDER CANCELLATION IN IMAGE SEQUENCES

RELATED APPLICATIONS

This application claims the priority benefits of PCT International Application PCT/IB2006/052673, filed Aug. 3, 2006, which claims priority to European Patent Application No. 05107305.4, filed Aug. 9, 2005.

The invention relates to motion judder cancellation in image sequences.

BACKGROUND OF THE INVENTION

A typical motion judder cancellation system comprises three parts: a film detector, a motion estimator, and a frame rate upconvertor. If the system processes interlaced image sequences, a deinterlacer can be present. The film detector detects if the incoming video sequence contains motion by analyzing information between consecutive images. This motion is classified in several common patterns of motion.

Video means there is motion every image. We also say that for video the temporal distance is 1 image. Every image is called a phase 0 image.

22 Pull-down means there is motion once every 2 images in a repetitive pattern. We will refer to the first of these as a base image. We call the base image the phase 0 image and the next image the phase 1 image. The temporal distance for 22 pull-down is 2 images. So there is no motion between consecutive images of phase 0 and 1 and there is motion between phase 1 and the new phase 0.

32 or 23 Pull-down means 3 images have no motion amongst each other and, then, 2 images have no motion amongst each other, or vice versa. Herein, the following definitions are used. In film mode, phase 0 and 3 are those images that are the first image of the repeating part. 32 pull-down would arrive in the following sequence phase 0, phase 1, phase 2, phase 3, phase 4, phase 0, phase 1, etc. Phase 0, 1 and 2 would relate the same first film image while phase 3 and 4 relate to the same second film image. Both the first of three images from the first film image, and the first of the two images from the second film image are referred to as a base image. The first base image is the phase 0 image, the next image the phase 1 image, the next image is the phase 2 image, the next image (which is a base image) is phase 3, and the next one is phase 4. The temporal distance for 32 pull-down is intermittently 3 and 2 images. So there is no motion between consecutive images of phase 0 and 1 and there is no motion between consecutive images of phase 1 and 2. There is motion between phases 2 and 3, but none between phases 3 and 4. From phase 4 to the new phase 0 there is motion again.

Any sequences that do not fall into one of these categories could be treated in a fallback mode, which is usually equivalent to the mode selected for the video pattern, potentially causing judder. Alternatively, sequences that do not fall into these categories will be treated as either 22 pull-down or 32 pull-down, potentially causing severe artifacts in the frame rate upconvertor.

If the pattern is not video, the motion estimator will typically use this pattern to estimate motion vectors between the most recent image and the most recent image that differs from the most recent image. These vectors will not be global for the entire image, but will be localized to specific areas of the image. Thus, these vectors indicate how parts of the image move over time. The vectors will be used by the frame rate upconvertor to interpolate new images between the most recent image and the most recent image that differs from the most recent image. The frame rate upconvertor outputs these new images instead of some images of the original pattern. Because now the sequence will not appear intermittently stationary, the motion will appear smoother to a viewer, canceling the so-called judder artifact.

Unfortunately, there are some exceptions to the above categories:

1. Some TV stations, like TMF and MTV, regularly broadcast material in which the images are partly in a pull-down pattern (e.g. background) and partly in a video pattern (e.g. ticker bars, presenter). So, in 32 pull-down mode, the film part of the image of phase 0, 1 and 2 is the same, while the video part is different among these phases. The same holds for phases 3 and 4: the film part is the same, while the video part is different. In 22 pull-down mode, the film part of the image of phase 0 and 1 is the same, while the video part is different among these phases.

2. Also in digital video pictures resulting from MPEG coding, a considerable pull-down contribution may be present. Besides motion being present between each two images, in this case there is also a pull-down-like motion pattern (e.g. a higher motion contribution between phase 1 and phase 0 and a lower motion contribution between phase 0 and phase 1). Processing this type of sequences as pull-down causes serious de-interlace artifacts.

With respect to the frame rate upconvertor, falling back to video will cause judder again in example 1 for the pull-down parts. Treating it as pull-down, will cause the frame rate upconvertor to introduce a new judder-like artifact in the video component. Also, the motion estimator will motion estimate inconsistent vectors, while the deinterlacer introduces severe artifacts.

WO 02/056597 and WO 2004/054256 disclose methods for recognizing film and video occurring in parallel in television images.

BRIEF SUMMARY OF THE INVENTION

It is, inter alia, an object of the invention to provide an efficient system for motion judder cancellation for use with video image sequences containing both video and pull-down motion. The invention is defined in the independent claims. Advantageous embodiments are defined in the dependent claims.

The invention is based on the recognition that prior art artifacts can efficiently be removed by introducing a hybrid processing mode. For detecting if images contain both a pull-down component and a video component, we use a film detector as disclosed in WO 02/056597 or WO 2004/054256, incorporated herein by reference. Main feature of this hybrid mode of the present invention is to treat some images (e.g. with 32 pull-down, the phase 0 and 3 images) as film and to disregard the other images (i.e. the phase 1, 2 and 4 images), even though parts of the latter images are non-repeating. The missing images are generated by means of the motion estimation process and the up-conversion process. Thereby, a smooth motion portrayal of both the video and the pull-down part of the picture is preserved, while no deinterlace artifacts are introduced.

In a preferred embodiment, when hybrid mode is detected, we will adapt the processing of the motion estimator, an optional deinterlacer and the frame rate upconvertor accordingly. The motion estimator needs to motion estimate on images in which the temporal distance is the same for the pull-down and the video component or the vectors will fluctuate erratically causing a bouncing motion in the video component. To achieve this we estimate motion between a base image and the image we receive two images before the base image. This causes the temporal distance to always be 2 images for both the video and pull-down components. Because of memory issues, we choose not to do this in phase 2.

To do good motion judder cancellation, the frame rate upconvertor needs a sequence that contains a pull-down rhythm. To achieve this we only use phase 0 and 3 images (32 pull-down mode) and phase 0 images (22 pull-down mode) in the frame rate upconvertor, effectively forcing the video component into a pull-down motion.

For interlaced image sequences, instead of putting the deinterlacer into an image-insertion mode (which results in optimal vertical sharpness, but only for true pull-down), in hybrid mode the deinterlacer is put into the video motion deinterlace mode.

Together, these measures create a smooth motion, even in hybrid image sequences.

These and other aspects of the invention will be apparent from and elucidated with reference to the embodiments described hereinafter.

DETAILED DESCRIPTION OF THE INVENTION

Figure 1:
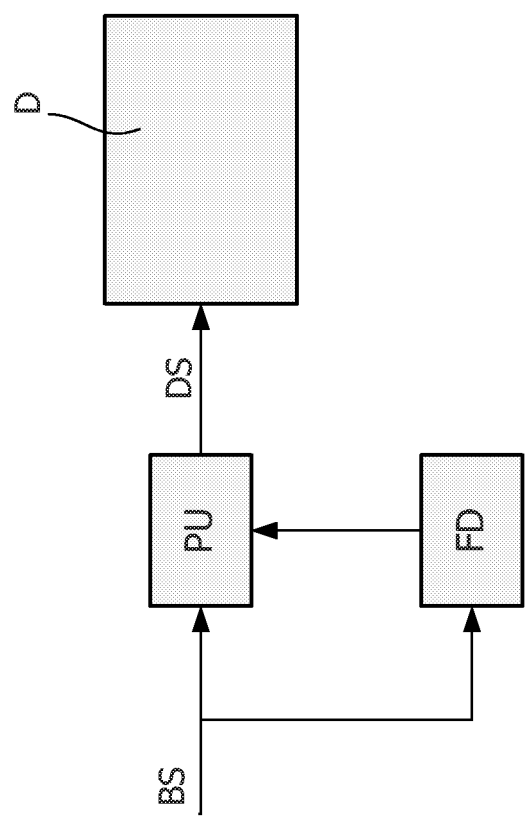
FIG. 1 shows an embodiment of a television display apparatus in accordance with the present invention.

In the embodiment of FIG. 1, an input baseband television signal BS is applied to a film detector FD. The film detector FD may be as disclosed by WO 02/056597 or WO 2004/054256, and is able to detect whether the input baseband television signal BS is pure video, pure film (22 or 32 pull-down), or hybrid (22 or 32 pull-down). The film detector controls a processing unit PU that carries out a motion vector estimation process EST and an up-conversion process UPC. An output of the processing unit PU supplies a display signal DS to a display device D.

Figure 2A:
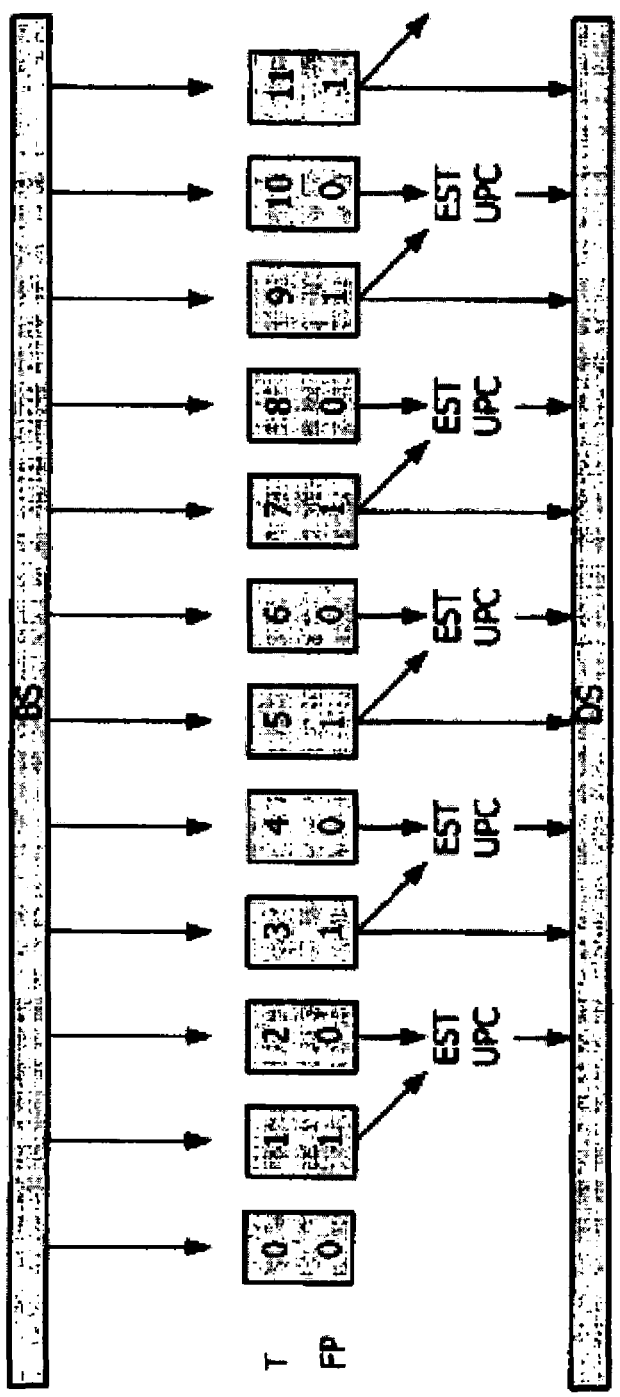
FIGS. 2A and 2B respectively illustrate a prior art film 22 pull-down motion judder removal and an inventive hybrid 22 pull-down motion judder removal.

FIG. 2A illustrates a prior art film 22 pull-down motion judder removal. The baseband signal BS includes a plurality of images at time instants T and having a film phase FP. In 22 pull-down, the film phase FP can be 0 or 1. As motion is only present between film phases 1 and 0, and not between film phases 0 and 1, considered from left to right in FIG. 2A, the images with film phases 1 and 0 are applied to the motion vector estimation process EST and the up-conversion process UPC so as to obtain output images for the display signal DS, while the image with film phase 1 directly end up in the display signal DS.

Figure 2B:
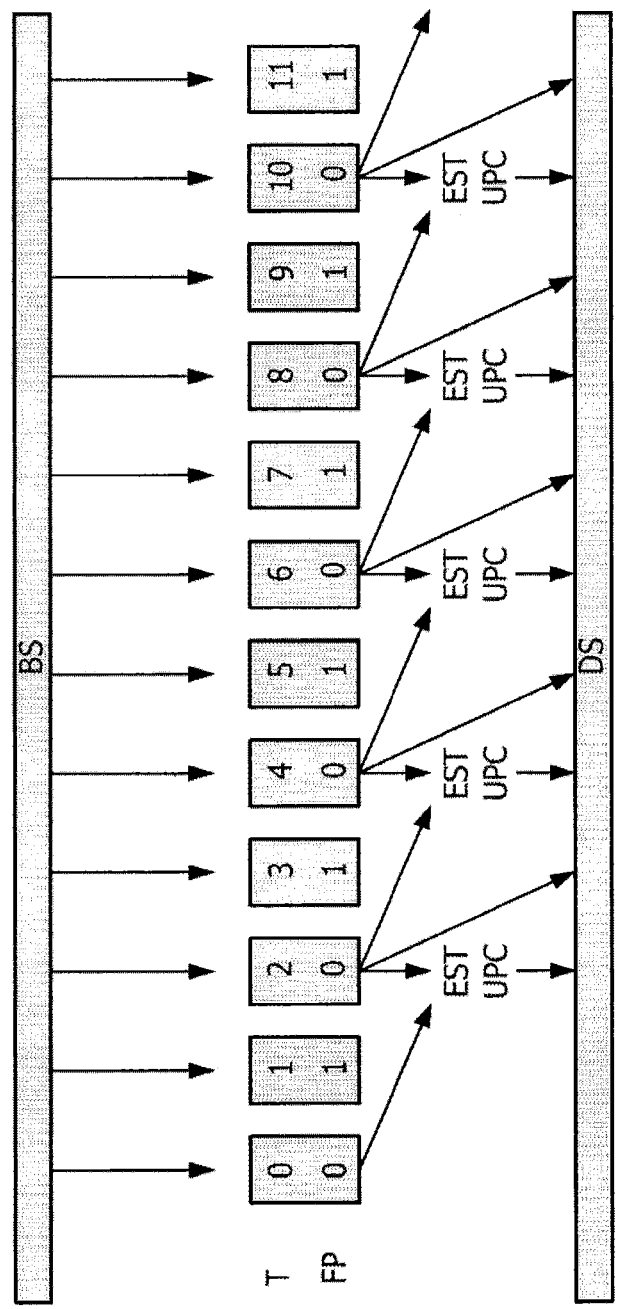

FIG. 2B illustrates an inventive hybrid 22 pull-down motion judder removal. In accordance with the invention, only the images with film phase 0 are used, while the images with film phase 1 are not used. In the display signal DS, images that are obtained by the motion vector estimation process EST and the up-conversion process UPC interleave images that are not processed in this way.

Figure 3A:
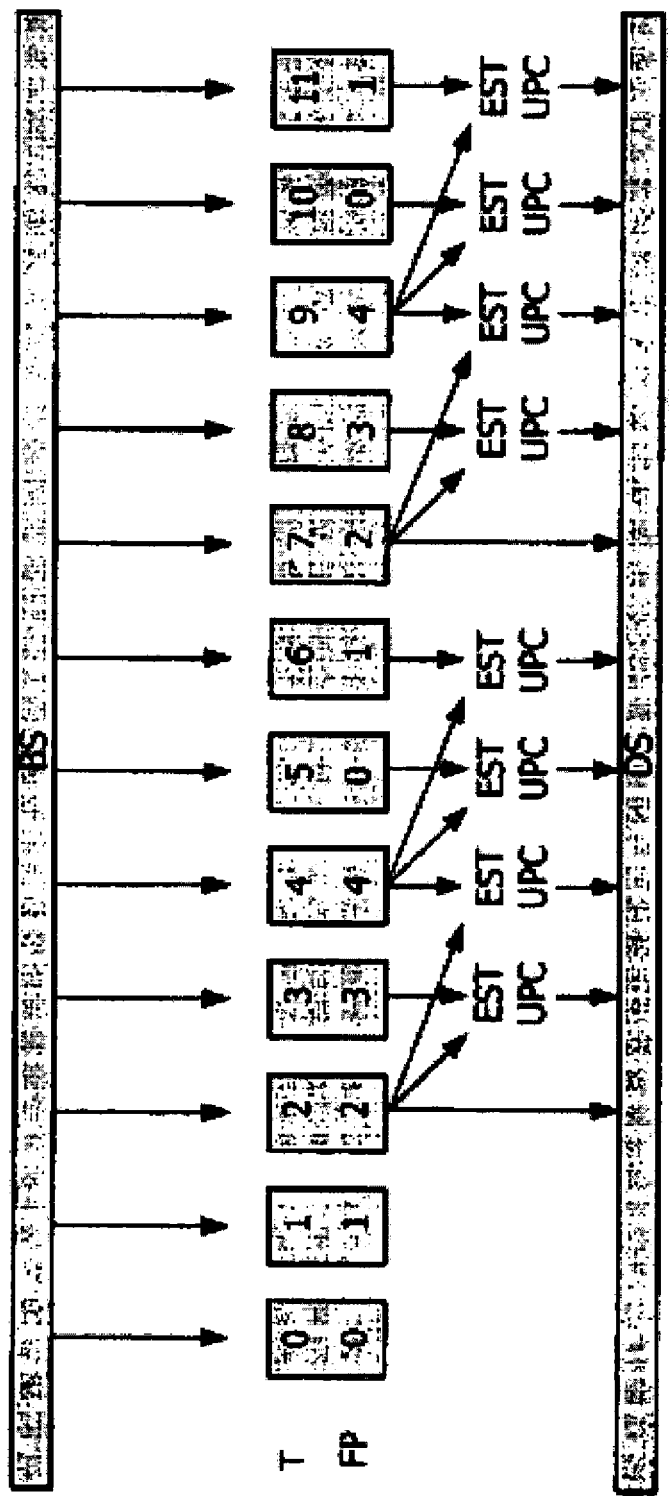
FIGS. 3A and 3B respectively illustrate a prior art film 32 pull-down motion judder removal and an inventive hybrid 32 pull-down motion judder removal.

FIG. 3A illustrates a prior art film 32 pull-down motion judder removal. The images with film phase 2 directly end up in the display signal DS. The images with film phases 3 and 4 are applied, together with the film phase 2 image, to the motion vector estimation process EST and the up-conversion process UPC to obtain output images for the display signal DS. The images with film phases 0 and 1 are applied, together with the film phase 4 image, to the motion vector estimation process EST and the up-conversion process UPC to obtain output images for the display signal DS.

Figure 3B:
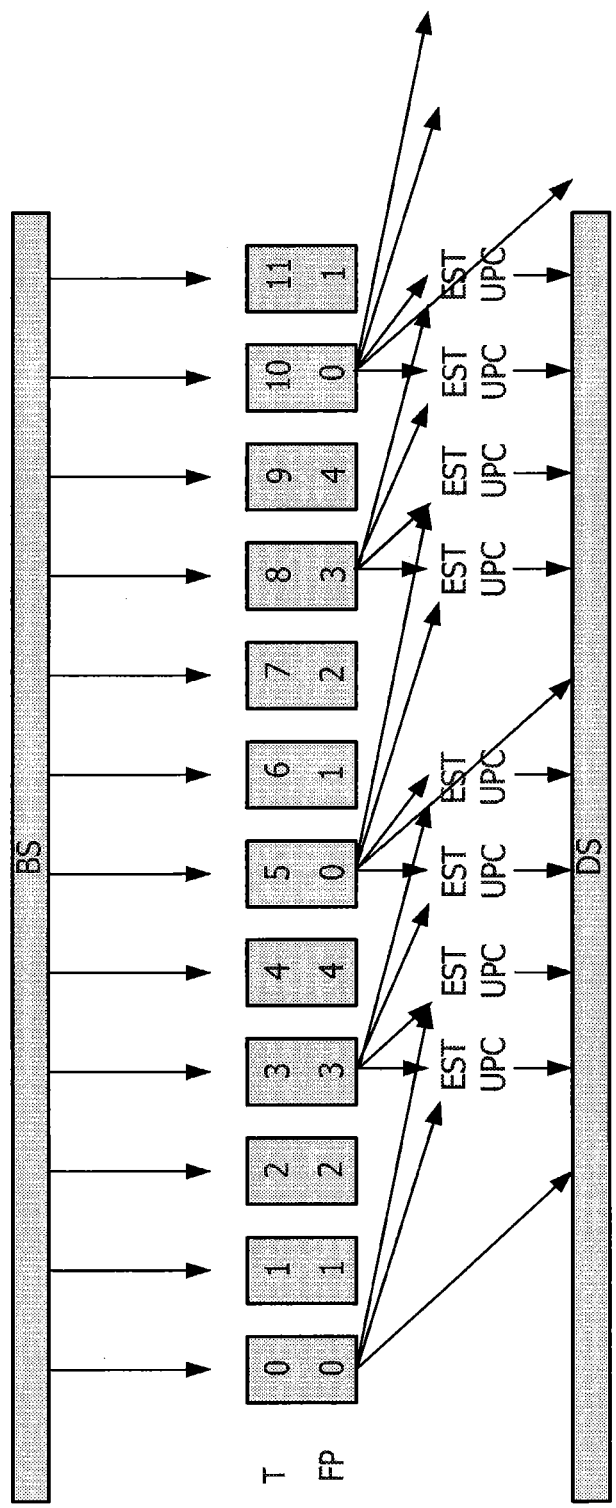

FIG. 3B illustrates an inventive hybrid 32 pull-down motion judder removal. In accordance with the invention, only the images with film phases 0 and 3 are used, while the images with film phases 1, 2, and 4 are not used. Display signal images with film phases 0 and 1 are obtained from baseband signal images with film phases 3 and 0 by the motion vector estimation process EST and the up-conversion process UPC. Display signal images with film phase 2 are directly obtained from baseband signal images with film phase 0. Display signal images with film phases 3 and 4 are obtained from baseband signal images with film phases 0 and 3 by the motion vector estimation process EST and the up-conversion process UPC.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of processing sequential baseband signal images, the method comprising:
   determining whether a first baseband signal image and a second baseband signal image includes both information from a film image and information from a video source image;
   if the determining indicates that one film image is present in both images while information from one video source image is present in only one image, then processing said baseband signal images, wherein only one of said first baseband signal image and second baseband signal image is used to obtain a display signal image.

2. A device comprising:
   a film detector for determining whether a first baseband signal image and a second baseband signal image includes both information from a film image and information from a video source; and
   a processing unit for processing said baseband signal images, wherein if one film image is present in both images while information from one video source image is present in only one image, only one of said first baseband signal image and second baseband signal image is used to obtain a display signal image.

3. A display apparatus, comprising: a device for processing baseband signal images as claimed in claim 2, and a display device.

4. The method of claim 1, further comprising obtaining a second display signal image by performing motion vector estimation and up-conversion on the first baseband signal image and a third baseband signal image.

5. The device of claim 2, wherein the processing unit is configured to obtain a second display image by performing motion vector estimation and up-conversion on the first baseband signal image and a third baseband signal image.

6. The device of claim 3, wherein the processing unit is configured to obtain a second display image by performing motion vector estimation and up-conversion on the first baseband signal image and a third baseband signal image.

7. A method of processing sequential baseband signal images, the method comprising:
- determining whether a first baseband signal image and a second baseband signal image includes both information from a film image and information from a video source image;
- if the determining indicates that one film image is present in both images while information from one video source image is present in only one image, then processing said baseband signal images using only baseband signal images with film phases 0 and 3, while not using images with film phases 1, 2, and 4.

\* \* \* \* \*